United States Patent [19]

West

[11] Patent Number: 4,955,589
[45] Date of Patent: Sep. 11, 1990

[54] HYDRAULICALLY DAMPED MOUNTING DEVICE

[75] Inventor: John P. West, Devizes, United Kingdom

[73] Assignee: Avon Industrial Polymers Limited, Melksham, United Kingdom

[21] Appl. No.: 492,232

[22] Filed: Feb. 23, 1990

Related U.S. Application Data

[63] Continuation of Ser. No. 288,675, Dec. 22, 1988, abandoned.

[30] Foreign Application Priority Data

Dec. 23, 1987 [GB] United Kingdom ............... 8730005

[51] Int. Cl.$^5$ .............................................. F16F 5/00
[52] U.S. Cl. ................................. 267/140.1; 267/219
[58] Field of Search ............ 248/562; 267/122, 140.1, 267/219, 220

[56] References Cited

U.S. PATENT DOCUMENTS

| | | |
|---|---|---|
| 1,823,694 | 9/1931 | Moorhouse . |
| 1,957,529 | 5/1934 | Deutsch . |
| 2,457,749 | 12/1948 | Thiry . |
| 2,705,118 | 3/1955 | Beck . |
| 3,101,937 | 8/1963 | Stearns . |
| 3,642,268 | 2/1972 | Hipsher . |
| 3,698,703 | 10/1972 | Hipsher . |
| 4,277,056 | 7/1981 | Heinzticks ............... 267/140.1 |
| 4,377,216 | 3/1983 | Ueno . |
| 4,407,491 | 10/1983 | Kunihiro . |
| 4,458,888 | 7/1984 | Wolf ............................ 267/140.1 |
| 4,625,933 | 12/1986 | Luciano et al. ............. 267/122 X |
| 4,690,389 | 9/1987 | West ............................ 267/140.1 |

FOREIGN PATENT DOCUMENTS

| | | |
|---|---|---|
| 0006819 | 1/1980 | European Pat. Off. . |
| 0009120 | 4/1980 | European Pat. Off. . |
| 0014742 | 9/1980 | European Pat. Off. . |
| 0027751 | 4/1981 | European Pat. Off. . |
| 0042910 | 1/1982 | European Pat. Off. . |
| 0050446 | 4/1982 | European Pat. Off. . |
| 0057774 | 8/1982 | European Pat. Off. . |
| 0065431 | 11/1982 | European Pat. Off. . |
| 0071698 | 2/1983 | European Pat. Off. . |
| 0088082 | 9/1983 | European Pat. Off. . |
| 0098330 | 1/1984 | European Pat. Off. . |
| 0098331 | 1/1984 | European Pat. Off. . |
| 0110195 | 6/1984 | European Pat. Off. . |
| 0110197 | 6/1984 | European Pat. Off. . |
| 115417 | 8/1984 | European Pat. Off. . |
| 0142943 | 5/1985 | European Pat. Off. . |
| 0164887 | 12/1985 | European Pat. Off. . |
| 172700 | 2/1986 | European Pat. Off. . |
| 1238784 | 9/1959 | Fed. Rep. of Germany . |
| 3142673A1 | 10/1981 | Fed. Rep. of Germany . |
| 3245653 | 12/1982 | Fed. Rep. of Germany . |
| 707701 | 12/1930 | France . |
| 2364373 | 4/1978 | France . |
| 2465927 | 3/1981 | France . |
| 2508582 | 12/1982 | France . |
| 56-63141 | 5/1981 | Japan . |
| 56-94043 | 7/1981 | Japan . |
| 57-94146 | 6/1982 | Japan . |
| 94147A | 6/1982 | Japan . |
| 57-138422 | 8/1982 | Japan . |

(List continued on next page.)

Primary Examiner—Duane A. Reger
Attorney, Agent, or Firm—Merchant, Gould, Smith, Edell, Welter & Schmidt

[57] ABSTRACT

A hydraulically damped mounting device has two anchor parts connected by a resilient wall which applies a spring force to relative vibrations of the anchor parts. Also connected to the anchor parts are two bellows walls each defining a corresponding chamber for hydraulic fluid, which chambers are interconnected by a passageway. The bellows walls deform substantially freely of spring resistance and so the volume of the corresponding chamber can change without spring resistance. Thus there is a pumping action of fluid between the chambers, giving a damping action due to the passageway, and hence the spring and damping characteristics of the mount are independently selectable.

11 Claims, 5 Drawing Sheets

FOREIGN PATENT DOCUMENTS

| | | |
|---|---|---|
| 57-138422 | 8/1982 | Japan . |
| 57-161331 | 10/1982 | Japan . |
| 58-81249 | 5/1983 | Japan . |
| 58-882405 | 5/1983 | Japan . |
| 59-37349 | 2/1984 | Japan . |
| 59-47541 | 3/1984 | Japan . |
| 0004640 | 1/1985 | Japan ............................ 267/140.1 |
| 0008539 | 1/1985 | Japan ............................ 267/140.1 |
| 1581935 | 6/1977 | United Kingdom . |
| 2041486 | 7/1979 | United Kingdom . |
| 2041488 | 8/1979 | United Kingdom . |
| 2068079A | 12/1980 | United Kingdom . |
| 1586178 | 3/1981 | United Kingdom . |
| 2104619A | 6/1982 | United Kingdom . |
| 2108239 | 10/1982 | United Kingdom . |
| 2132311A | 12/1983 | United Kingdom . |

HYDRAULICALLY DAMPED MOUNTING DEVICE

This is a continuation, of application Ser. No. 288,675, filed Dec. 22, 1988 now abandoned.

BACKGROUND OF THE INVENTION

1. Field of the Invention

The present invention relates to a hydraulically damped mounting device. Such devices usually have a pair of chambers for hydraulic fluid, connected by a suitable orifice, and damping is achieved due to the flow of fluid through that orifice.

2. Description of the Prior Art

In EP-A-0115417 and EPA-0172700, I discussed two different types of hydraulically damped mounting devices for damping vibration between two parts of a piece of machinery, e.g. a car engine and a chassis. EP-A-0115417 disclosed various "cup and boss" type of mounting devices, in which a "boss", forming one anchor part to which one of the pieces of machinery was connected, was itself connected via a (normally) resilient wall to the mouth of a "cup", which was attached to the other piece of machinery and formed another anchor part. The cup and the resilient wall then defined a working chamber for hydraulic fluid, which was connected to a compensation chamber by a passageway (usually elongate) which provided the damping orifice. The compensation chamber was separated from the working chamber by a rigid partition, and a flexible diaphragm was in direct contact with the liquid in the working chamber and separated that liquid from a gas pocket.

In EP-A-0172700 the mounting devices disclosed were of the "bush" type. In this type of mount, the anchor part for one part of the vibrating machinery is in the form of a hollow sleeve with the other anchor part in the form of a rod or tube extending approximately centrally and coaxially of the sleeve. In EP-A-0172700 the tubular anchor part was connected to the sleeve by resilient walls, which defined one of the chambers in the sleeve. That chamber was connected via a passageway to a second chamber bounded at least in part by a bellows wall which was effectively freely deformable so that it could compensate for fluid movement through the passageway without itself resisting that fluid movement.

SUMMARY OF THE INVENTION

The present invention derived from "bush" type mounts, but is applicable also to other types. In essence, the present invention proposes that a pair of chambers connected by a passageway are each bounded by a bellows wall. As mentioned above, such a wall permits the volume of the corresponding chamber to change, without a spring resistance being applied to the fluid within the chamber and there can thus be a pumping action between the chambers.

Normally, when the mount is to support a load there will, in addition to the bellows wall, be a resilient wall which acts as a support between the anchor parts of the mount. However, where only damping is needed, the resilient wall may be omitted.

When applied to a "bush" type mount, which is to support a load, the central anchor part is connected to the sleeve, a resilient wall which preferably is positioned so that it straddles the center line of the mount under load, so that it resists movement approximately equally in the normal directions of vibration of the mount. The two bellows walls are then placed on opposite sides of the central anchor part, and extend between that anchor part and the sleeve. For maximum effect, the bellows walls extend in the direction of vibration of the mount, i.e. approximately perpendicularly to the resilient wall when a load is applied. The two chambers bounded by the bellows walls (effectively two compensation chambers) are interconnected by a passageway, which preferably extends through the central anchor part.

One problem with such a mount is that excessive vibration of the central anchor part relative to the sleeve could result in one or other of the compensation chambers being made so small, by a flexion of the bellows wall, that the central anchor part is the wall of that compensation chamber adjacent the sleeve. This could cause damage, and therefore resilient blocks may be provided on the central anchor part and/or within the chamber adjacent the wall of the sleeve, to minimize such damage. If suitably designed, the resilient blocks may also be used to provide a progressive spring characteristic for high amplitude vibrations. These may occur for example, when a high torque input is applied.

In both EP-A-0115417 and EP-A-0172700 we described how high frequency vibrations could be absorbed with minimal damping by bounding part of one of the chambers for hydraulic fluid with a flexible diaphragm. That diaphragm could move freely (although excessive vibration is normally limited by abutments on either side of the diaphragm) with one side of the diaphragm contacting the hydraulic fluid and the other contacting a gas. The gas may be provided either by a separate gas pocket, or simply by having one side of the diaphragm open to the exterior of the mount. Such a diaphragm may also be provided bounding part of one or both of the chambers of the present invention, again to limit high frequency vibrations.

In a further arrangement, a flexible diaphragm may be provided which acts as part of the separation between the two chambers. Thus, a bore may be provided between the chambers, e.g. through the central anchor part, which bore is blocked by a flexible diaphragm. Again, the vibration of such a diaphragm will preferably be limited by abutments on either side. This development may be taken further, by providing flow paths for fluid around the diaphragm, which may then replace the passageway interconnecting the chambers to provide fluid damping. The fluid damping then comes from the resistance to flow of the fluid around the diaphragm.

As was mentioned above, the present invention is not limited to "bush" type mounts. Thus, for example, the two anchor points may simply be a pair of plates held apart by rubber blocks which form the spring element of the mount. The bellows wall extends between the two plates to define one fluid chamber. A hole in one of the plates then communicates with another chamber, again bounded by a bellows wall. This system may be used in the "V-mounting", in which there are two inclined axes of vibration. Then, the rubber blocks correspond to the vibration axes and the axes are connected together by a pair of rigid plates, between which there is one chamber of the mounting device.

Another aspect of the invention concerns the way the resilient walls are formed. They may, of course, be simple rubber mouldings bonded to the anchor parts. However, there is advantage if the central anchor parts have a three-part structure. Firstly, a rigid outer part is formed with an aperture therethrough, and plastics material to form the bellows wall(s) is then blow moulded around the outer part, so that it extends through the aperture. Then, two inner parts are fitted within the aperture to clamp the blow moulded plastics material to the outer part. Preferably, this is achieved by making the two inner parts form a clamp which not only grips the plastics material but also grips the outer part. For further rigidity, a tube may extend through the outer part and one of the inner parts, so that the two are rigidly fixed together. This tube may itself form the fixing to which one part of the vibrating machinery is connected.

BRIEF DESCRIPTION OF THE DRAWINGS

Embodiments of the invention will now be described in detail, by way of example, with reference to the accompanying drawings, in which.

DETAILED DESCRIPTION

Figure 1:
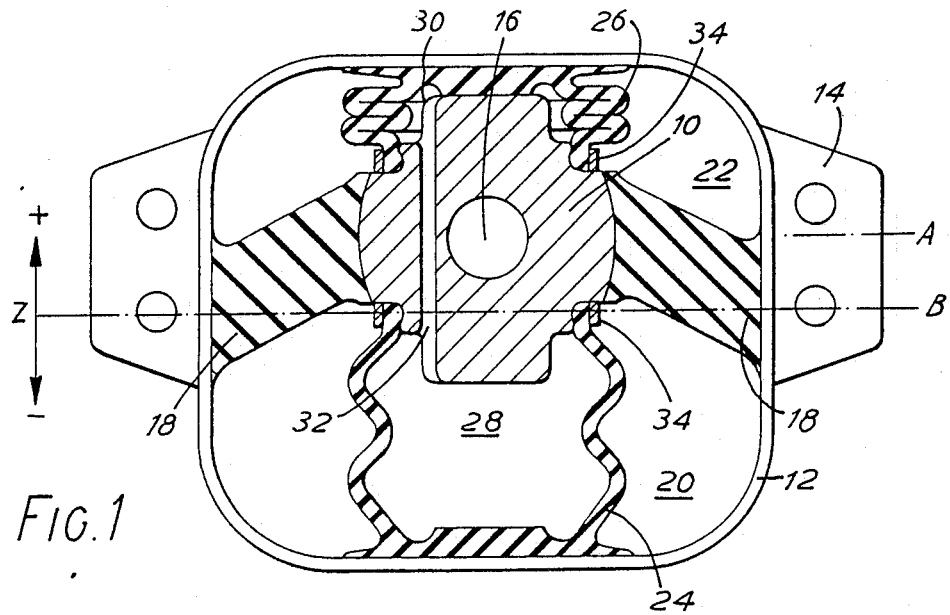
FIG. 1 shows a first embodiment of the present invention.

As can be seen from FIG. 1, the first embodiment of the present invention is a "bush" type mount in which a central anchor part 10 is located within a sleeve 12 forming the second anchor part. As illustrated, the sleeve 12 may have flanges 14 which enable it to be fixed to one part of vibrating machinery. The central anchor part 10 has a bore 16 to which another part of the vibrating machinery may be attached. The central anchor part 10 and the sleeve 12 are interconnected by resilient walls 18. As illustrated in FIG. 1, no load is applied to the mount, and therefore the resilient walls 18 bias the central anchor part 10 upwardly in the figure, so that the center of the bore lies on a line A. However, the mount is designed so that, under normal loading, the bore 16 is lowered to a line B, at which the resilient walls extend generally in the direction of line B, and therefore give effectively equal characteristics for movement upward or downwards, assuming that the normal vibration applied to the mount is in the direction of arrow Z.

Spaces 20,22 are thus formed within the sleeve 12 on either side of the resilient walls 18, and each space 20 contains a bellows wall 24,26, extending between the sleeve 12 and the central anchor part 10. These bellows walls 24,26 define compensation chambers 28,30 (the compensation chamber 30 is very small in the rest position of the mount) and are interconnected by a passageway 32. When the mount is in the loaded position, these chambers 28,30 are approximately symmetric, and as the central anchor part 10 moves relative to the sleeve 12 in the direction of arrow Z, hydraulic fluid is moved from one chamber to the other via the passageway 32. Since the chambers 28,30 are bounded by bellows walls 24,26, the change in volume of the chamber necessary to allow the fluid movement is absorbed with little or no resistance by the bellows walls 24,26, so that the bellows walls 24,26 do not add a spring characteristic to the mount behaviour. The spring characteristic is thus due entirely to the resilient walls 18, with the damping being due to the movement of the hydraulic fluid through the passageway 32.

The embodiment of FIG. 1 may be modified when the mount is to act as a damper only, and not directly to carry a load. In this case, the resilient walls 18 may be omitted, so that the mount has no spring characteristics, and operates entirely due to fluid movement through the passageway 32.

The bellows walls 24,26 may be made of suitable rubber material, but are preferably of thermoplastics blow moulded material, which, when suitably designed, can give very low axial stiffness but high pressure/volume gradient. This latter characteristic is desirable in order to achieve high levels of pressure, and hence high damping. Thermoplastic bellows give similar characteristics to fabric reinforced rubber bellows without the attendant manufacturing problems. A suitable plastic material is Dupont "Hytrel" but other, similar, thermoplastic rubbers may be used. As shown in FIG. 1, the bellows walls 24,26 are bonded to the sleeve, and attached by clamps 34 to the central anchor part 10, but other methods of attachment may be used as will be described later.

Figure 2:
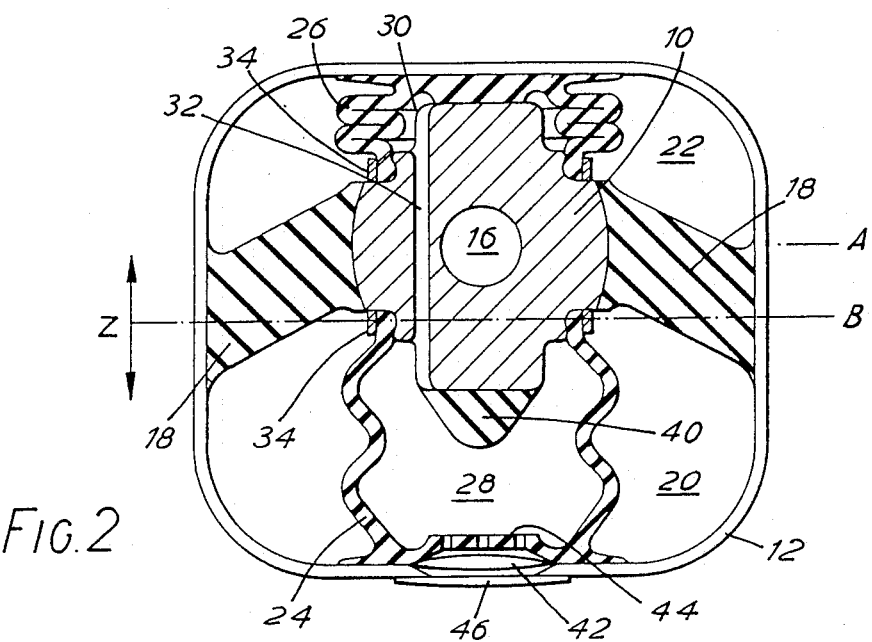
FIG. 2 shows a second embodiment of the present invention.

The second embodiment of the present invention, shown in FIG. 2, is similar to that of the first shown in FIG. 1, and the same reference numerals are used to indicate corresponding parts. The embodiment of FIG. 1 has the problem that if the mount is loaded too heavily, or the amplitude of vibration is too great, the central anchor part 10 may strike the interior of one of the chambers 28,30 adjacent the sleeve 12. This would cause a sudden shock which is to be avoided. Therefore, the second embodiment has resilient vibration stops in the form of rubber blocks 40 mounted on one, or possibly both, sides of the central anchor part 10 within the chambers 28,30. These blocks will act as stops, to prevent damage during excessive vibration or overload. Also, the embodiment of FIG. 2 shows that one, or possibly, both, chambers 28,30 may be partially bounded by a flexible diaphragm 42 which absorbs high frequency small amplitude vibrations. As was mentioned above, the behaviour of such a diaphragm has been described in detail in EP-A-0115417 and EP-A-0172700 and will not be described now. It can be seen however, that abutments 44,46 may be provided on either side of the diaphragm 42 to limit its vibration. Thus, at high frequencies, the diaphragm 42 absorbs the vibration and there is little or no fluid movement through the passageway 32. The behaviour of the mount is then due entirely to the resilient walls 18 (if provided) and the movement of the diaphragm 42 between the abutments 44,46.

Of course, the resilient block 40 may be provided on the inside of the chamber 28 adjacent the sleeve 12, rather than on the central anchor part 10.

Figure 3:
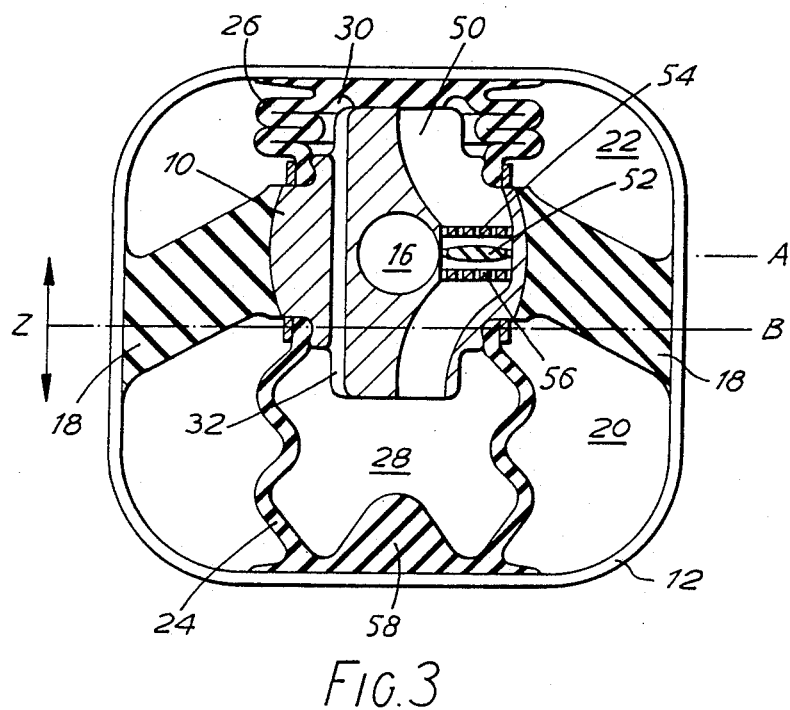
FIG. 3 shows a third embodiment of the present invention.

In the third embodiment, shown in FIG. 3, the idea of the flexible diaphragm is modified by placing that flexible diaphragm between the two chambers 28,30. Again in this embodiment, a bore 50 is provided in the central anchor part 10 and a diaphragm 52 extends across that bore at some suitable intermediate point, so that the parts of the bore 50 on each side of the diaphragm 52 brings the diaphragm in communication with the corresponding compensation chamber 28,30. Again, abutments 54,56 are provided on either side of the diaphragm 52 to limit its vibration. FIG. 3 also illustrates the presence of a resilient vibration stop 58 in the chamber 28 adjacent the sleeve 12. Apart from the presence of bore 50, diaphragm 54, and resilient stop 58, the third embodiment shown in FIG. 3 is generally similar to that of the first two embodiments, and corresponding reference numerals are used.

Figure 4:
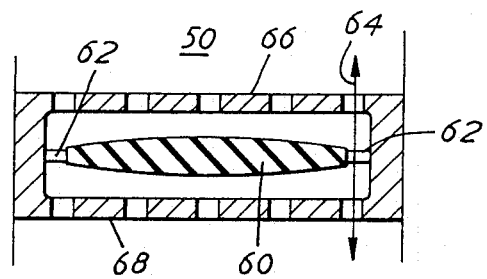
FIG. 4 shows a detail of a flexible diaphragm which may be used to modify the embodiment of FIG. 3.

In the embodiment shown in FIG. 3, two separate paths are provided through the central anchor part 10, one forming the passageway 32 and the other forming bore 50. FIG. 4 shows a modification suitable for the embodiment of FIG. 3, in which the expense of providing two paths is eliminated. As shown in FIG. 4, a diaphragm 60 may be provided in the bore 50, which diaphragm 60 has openings 62 through which hydraulic fluid may pass as shown by arrow 64. Then, the passageway 32 can be omitted, since it is effectively formed by the openings 62. FIG. 4 also illustrates upper and lower abutments 66,68, having apertures therein for fluid communication. The abutments 66,68 limit the vibration of the diaphragm 60.

Figure 5:
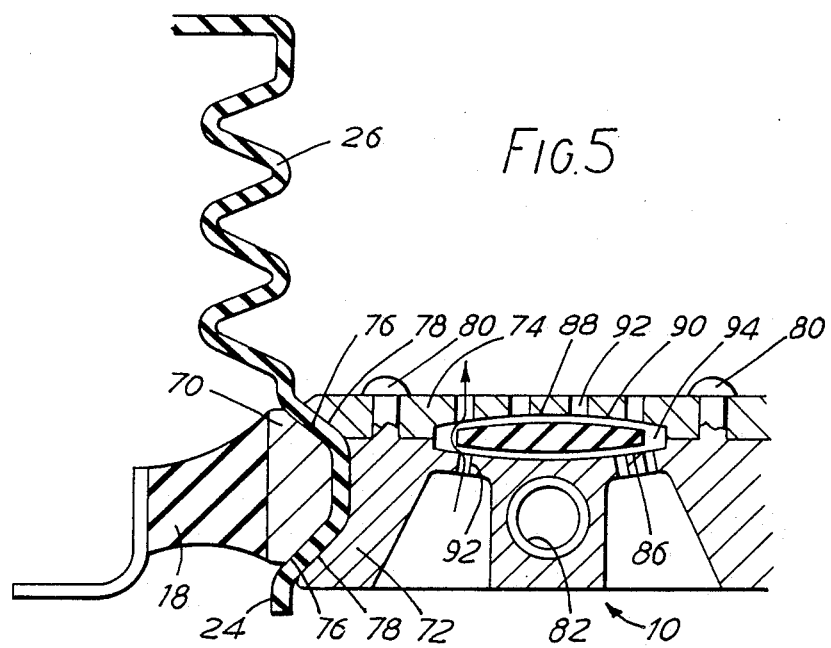
FIG. 5 shows a detail of a further way of modifying the embodiment of FIG. 3.
Figure 6:
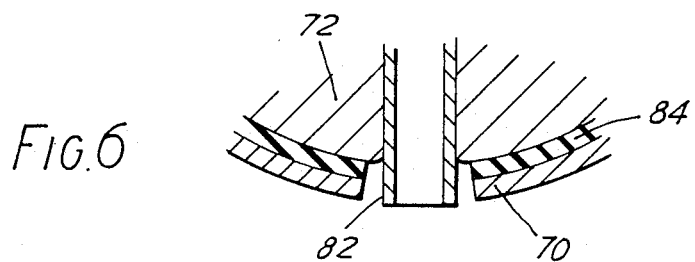
FIG. 6 shows part of the central anchor part of FIG. 5.

FIG. 5 shows a further development of the idea of FIG. 4, which may also be used to modify the embodiment of FIG. 3. This arrangement is advantageous because it makes easy the connection of the bellows walls to the central anchor part. In this arrangement, the central anchor part 10 is composed of three elements. Firstly, there is an outer rigid part 70 of e.g. metal, having an aperture therethrough. The bellows walls 24,26 are then formed by blow moulding plastics material so that it passes through the aperture in part 70, so that the walls 24,26 are connected together. Then, two further rigid parts 72,74 are fitted into the aperture in outer part 70. As can be seen, the outer part 70 has inwardly sloping walls on either side of the aperture, and the two inner parts 72,74 have correspondingly sloping walls 78 which, when the inner parts 72,74 are secured together by e.g. rivets 80, act as a clamp which holds the plastics material forming the walls 24,26, and also the outer part 70. The point of attachment to the central anchor part 10 may be provided by a tube 82 fitted into one of the inner parts 72, which, as shown in FIG. 6, extends through the plastics material 84 forming the walls 24,26, and also through an opening in the outer part 70, so that the rigid clamping of the outer part 70 to the inner part 72 is further improved.

FIG. 5 also shows an alternative configuration for the diaphragm between the chambers, in which the inner parts 72,74 have recesses 86,88 between which is fitted a diaphragm 90, so that it is free to vibrate in the space between the inner part 72,74 formed by recesses 86,88. It can also be seen in FIG. 5 that, by providing apertures 92 in the inner part 72,74 adjacent the recesses 86,88 the inner part 72,74 of the central anchor part 10 may provide abutments for the diaphragm 90, with openings 94 at e.g. the edges of the diaphragm 90 providing a path for fluid communication from one compensation chamber of the mount to the other.

Figure 7:
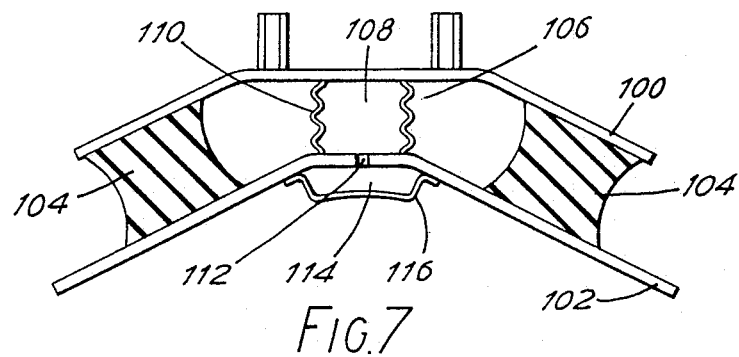
FIG. 7 shows a fourth embodiment of the invention.

The present invention is not limited to mounting devices of the "bush" type in which one anchor point is positioned centrally within an outer sleeve forming the other anchor point. The fourth embodiment of the invention, shown in FIG. 7 shows a different type of mounting device, in which one anchor point is formed by a first plate 100 and the second anchor point by another plate 102 spaced apart from each other by resilient blocks 104. These resilient blocks 104 give the spring characteristic to the mount. As can be seen, a space 106 is formed between the blocks 104 and the plates 100,102, and this space 106 contains a first chamber 108 for hydraulic fluid bounded by a bellows wall 110. One of the plates 102 has a bore 112 therethrough, which permits fluid communication therethrough from the chamber 108 to another chamber 114, which is also bounded by a flexible wall. Thus, vibration of the plates 100,102 causes expansion or contraction of the bellows wall 100, so changing the volume of the chamber 108 and causing damping as fluid is forced through the bore 112.

Figure 8:
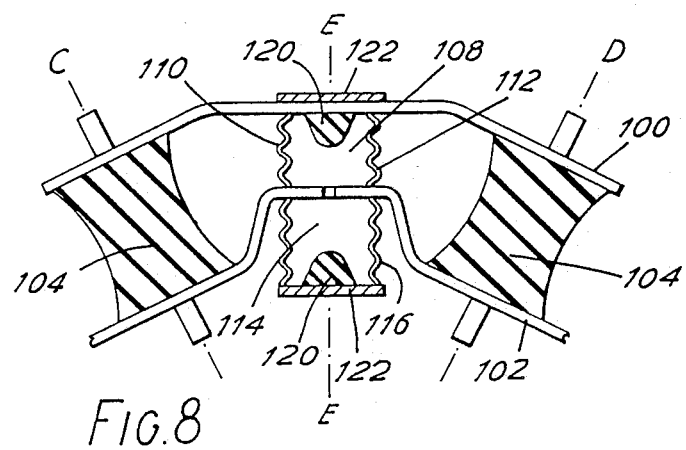
FIG. 8 shows a fifth embodiment of the present invention.

This embodiment is further developed in the fifth embodiment, shown in FIG. 8, in which the mount is subject to vibrations in two inclined directions. The embodiment is otherwise similar to that of FIG. 7, and corresponding reference numerals will be used. In FIG. 8, the vibrations are not simply up and down, as in the case of the embodiment of FIG. 7, but may be on the lines C or D. It can be seen that the resilient blocks 104 correspond to these directions of vibration, and therefore give spring characteristic for vibration along either axis. However, any such vibration will also change the space between the plates, hence changing the volume of the chamber 108 and so causing damping. In this embodiment, resilient stops 120 are also provided within the chambers 108,114.

Figure 9:
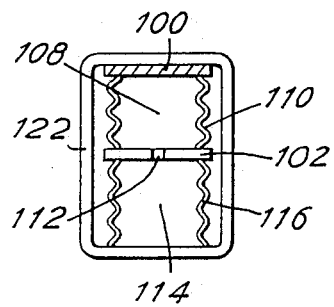
FIG. 9 shows a section through the fifth embodiment, along the line E—E in FIG. 8.

FIG. 9, which is a cross-section along the line E—E in FIG. 8 shows more clearly the sleeve 122 which surrounds the bellows walls 100,116. This sleeve is secured to one of the plates 100, the other plate 102 passes through it, at approximately a central position. Thus, on each side of the plate 102, the bellows walls 110,116 extend to a rigid fixing point on the sleeve, thereby equalizing the characteristics of the mount as it vibrates.

Figure 10:
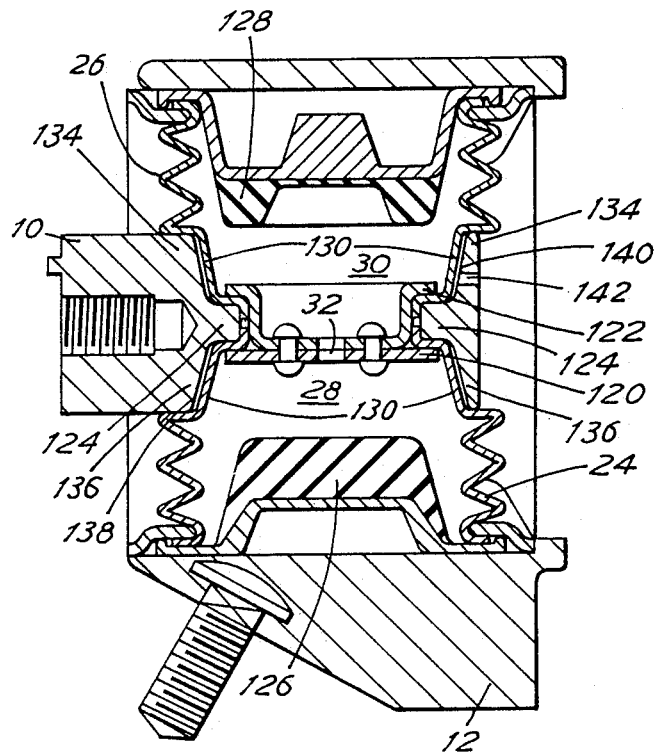
FIG. 10 shows a sixth embodiment of the present invention.

FIG. 10 shows another embodiment of the invention, in which one of the bellows walls also forms a diaphragm covering a gas pocket. This embodiment is similar to that of FIG. 1 and the same reference numerals are used for corresponding parts. Since the view of FIG. 10 is perpendicular to that of FIG. 1, the resilient walls cannot be seen. If, however, the mount is to support a load there will be such resilient walls between the central anchor point 10 and the sleeve 12 in this embodiment.

The central anchor part 10 has an aperture therethrough, and the bellows walls 24,26 are formed as an integral unit (as in the embodiment of FIG. 5) passing through that aperture. Extending across the aperture are two plates 120,122 which are clamped together and form a rigid partition between the two chambers 28,30 for hydraulic fluid. The passageway 32 between those two chambers 28,30 is formed by aligned bores in the two plates 120,122. The plates are shaped so that their ends are spaced apart and clamp the bellows walls 24,26 to a projection 124, on the central anchor point 10 within the aperture. Thus, the central anchor point 10 is clamped to the bellows walls 24,26 and hence vibrations of that central anchor point 10 relative to the sleeve will be transmitted to the hydraulic fluid. As before, resilient blocks 126,128 may be provided in the chambers 28,30 to limit large amplitude vibrations.

In this embodiment, parts 130,132 of the bellows walls 24,26 within the aperture in the central anchor part are not convoluted, but under the normal loading of the mount lie adjacent but spaced from adjacent parts 134,136 of the central anchor part 10. This spacing creates air pockets 138,140 between the bellows walls 24,26 and the central anchor part. It can be seen from FIG. 10 that, due to the shape of the aperture in the central anchor part 10, there is one annular pocket 138 separated from chamber 28 by wall part 130 and another pocket 140 separated from chamber 30 by wall part 132. Bleed orifices (one being shown at 142) may be provided extending from the pockets to permit pressure equalization. The value of such bleed orifices was explained in EP-A-0115417.

With the mount of this embodiment, high frequency small amplitude vibrations will result in the flexing of wall parts 130,132 and hence a change in volume of the pockets 138,140. Thus the need for additional diaphragms, such as shown in FIGS. 2 to 5, is eliminated, but retaining the advantage of a limited undamped compliance within the mount. Of course, at higher amplitudes the wall parts 130,132 will come into contact with adjacent parts 134,136 of the central anchor part 10, so that further movement causes fluid transfer through the passageway 32.

Thus, according to the present invention, a hydraulically damped mounting device may be provided in which the chambers for hydraulic fluid are both bounded by walls which do not have a spring characteristic. Therefore, the spring characteristic of the mount, assuming any such characteristic is needed, is separate from the hydraulic damping which allows flexibility in selection of the characteristics of the mount.

What is claimed is:

1. A hydraulically damped mounting device, comprising:
    a first anchor part;
    a second anchor part;
    a first bellows wall interconnecting said first and second anchor parts;
    a first chamber for hydraulic fluid at least partially defined by said first bellows wall;
    a second bellows wall connected to said first anchor part;
    a second chamber for hydraulic fluid at least partially defined by said second bellows wall;
    a passageway interconnecting said first chamber and said second chamber; and
    a resilient wall interconnecting said first and second anchor parts, said resilient wall being independent of said first and second bellows wall;
    whereby the volumes of the first and second chambers are changeable due to movement of the corresponding bellows wall with substantially no spring resistance applied to said hydraulic fluid by said bellows wall.

2. A hydraulically damped mounting device, comprising:
    a first anchor part;
    a second anchor part in the form of a hollow sleeve, said first anchor part being located within said sleeve;
    a first bellows wall interconnecting said first and second anchor parts;
    a first chamber for hydraulic fluid at least partially defined by said first bellows wall;
    a second bellows wall connected to said first anchor part;
    a second chamber for hydraulic fluid at least partially defined by said second bellows walls; and
    a passageway interconnecting said first chamber and said second chamber;
    whereby the volumes of the first and second chambers are changeable due to movement of the corresponding bellows wall with substantially no spring resistance applied to said hydraulic fluid by said bellows walls.

3. A hydraulically damped mounting device, comprising:
    a first anchor part;
    a second anchor part;
    a first bellows wall interconnecting said first and second anchor parts;
    a first chamber for hydraulic fluid at least partially defined by said first bellows walls;
    a second bellows wall connected to said first anchor part;
    a second chamber for hydraulic fluid at least partially defined by said second bellows walls, one of said first and second chambers being partially bounded by a flexible diaphragm; and
    a passageway interconnecting said first chamber and said second chamber;
    whereby the volumes of the first and second chambers are changeable due to movement of the corresponding bellows wall with substantially no spring resistance applied to said hydraulic fluid by said bellows walls.

4. A hydraulically damped mounting device, comprising:
    a first anchor part;
    a second anchor part;
    a first bellows wall interconnecting said first and second anchor parts;
    a first chamber for hydraulic fluid at least partially defined by said first bellows wall;
    a second bellows wall connected to said first anchor part, said first and second bellows walls being integral, and said second anchor part including a rigid inner part within said first and second bellows walls, which inner part separates said first and second chambers, and a second rigid part outside said first and second bellows walls, said first and second bellows walls being clamped between said inner part and said outer part;
    a second chamber for hydraulic fluid at least partially defined by said second bellows walls; and
    a passageway interconnecting said first chamber and said second chamber;
    whereby the volumes of the first and second chambers are changeable due to movement of the corresponding bellows wall with substantially no spring resistance applied to said hydraulic fluid by said bellows walls.

5. A hydraulically damped mounting device according to claim 2, wherein said first and second chambers are on opposite sides of said first anchor part within said sleeve.

6. A hydraulically damped mounting device according to claim 1, further including a bore extending between said first and second chambers, and a flexible diaphragm extending across said bore.

7. A hydraulically damped mounting device according to claim 1, further including a flexible diaphragm extending partially across said passageway.

8. A hydraulically damped mounting device according to claim 1, further including at least one resilient stop provided in at least one of said first and second chambers.

9. A hydraulically damped mounting device according to claim 8, wherein said at least one resilient stop is located adjacent said second anchor part.

10. A hydraulically damped mounting device according to claim 2, further including a bore extending between said first and second chambers, and a flexible diaphragm extending across said bore.

11. A hydraulically damped mounting device according to claim 2, further including a flexible diaphragm extending partially across said passageway.

* * * * *